United States Patent
Kimppa

(10) Patent No.: US 6,714,765 B1
(45) Date of Patent: Mar. 30, 2004

(54) TRANSCEIVER FOR TRANSMITTING AND RECEIVING AN RF SIGNAL ON AT LEAST TWO FREQUENCY RANGES

(75) Inventor: Harri Kimppa, Salo (FI)

(73) Assignee: Nokia Mobile Phones Ltd., Espoo (FI)

( * ) Notice: Subject to any disclaimer, the term of this patent is extended or adjusted under 35 U.S.C. 154(b) by 605 days.

(21) Appl. No.: 09/590,111

(22) Filed: Jun. 8, 2000

(30) Foreign Application Priority Data

Jun. 10, 1999 (FI) .................................................. 991329

(51) Int. Cl.[7] .................................................. H04B 1/40
(52) U.S. Cl. ........................ 455/76; 455/552.1; 455/82; 455/83
(58) Field of Search ........................... 455/552.1, 553.1, 455/556.1, 557, 76, 77, 84, 86, 87, 196.1–197.1, 190.1, 189.1, 313, 318, 323, 82, 83, 141

(56) References Cited

U.S. PATENT DOCUMENTS

| 5,535,432 | A | * | 7/1996 | Dent | 455/77 |
| 5,564,076 | A |   | 10/1996 | Auvray | 455/76 |
| 5,794,159 | A | * | 8/1998 | Portin | 455/553.1 |
| 5,966,666 | A | * | 10/1999 | Yamaguchi et al. | 455/552.1 |
| 5,983,081 | A | * | 11/1999 | Lehtinen | 455/76 |
| 5,983,082 | A | * | 11/1999 | Hilbert | 455/76 |
| 5,999,824 | A |   | 12/1999 | Na | 455/553 |
| 6,088,348 | A | * | 7/2000 | Bell et al. | 370/343 |

FOREIGN PATENT DOCUMENTS

| EP | 0594894 A1 | 5/1994 |
| EP | 0653851 B1 | 5/1995 |
| EP | 0 798 880 A2 | 10/1997 |
| EP | 0800283 A3 | 10/1997 |
| EP | 0 800 283 A2 | 10/1997 |
| GB | 2 320 858 A | 7/1998 |
| WO | WO 99/01933 | 1/1999 |
| WO | WO 00/31885 | 6/2000 |

* cited by examiner

Primary Examiner—Temica M. Davis
(74) Attorney, Agent, or Firm—Perman & Green, LLP

(57) ABSTRACT

The object of the invention is a transceiver for transmitting and receiving an RF signal on at least two operating frequency ranges. One idea of the invention is to use a transceiver based on the direct transform and where the mixing frequency is generated with the aid of the same synthesiser. This is preferably realised so that when operating on frequency ranges far from each other the output signal of the synthesiser is divided with different divisors in order to generate the mixing frequency (211, 231, 261, 281). When operating on frequency ranges which are close to each other the divisor (P) used in the feedback of the synthesiser is advantageously changed (248). With the aid of the invention two mixing signals with a mutual phase difference of 90 degrees can be generated in connection with the division of the synthesiser frequency, whereby no RC phase shifters are required in the signal line, and a good phase accuracy is obtained which is independent of the frequency.

13 Claims, 3 Drawing Sheets

TRANSCEIVER FOR TRANSMITTING AND RECEIVING AN RF SIGNAL ON AT LEAST TWO FREQUENCY RANGES

The object of the invention is a transceiver for transmitting and receiving an RF signal on at least two operating frequency ranges.

Mobile communication systems are developing and spreading very fast, and therefore systems of many different standards have been built or are being built in many areas. Therefore there has arisen a need for mobile stations which can be used in more than one system. As examples we can mention the digital systems of the GSM type (Global System for Mobile communications) operating on the frequency ranges 900 MHz, 1800 MHz and 1900 MHz, of which the system with the frequencies 1800 and 1900 MHz are also called DCS and PCN systems. These systems operate on different frequency ranges, but otherwise their specifications are closely related. A problem in realising a transmitter/receiver or transceiver is how to avoid the need for separate transmitter and receiver circuits for all frequency ranges.

From the patent publication EP 653851 there is known a transceiver arrangement which uses one local oscillator having a frequency which is selected between the lower operating frequency range and the higher operating frequency range, so that the same intermediate frequency can be used for the operation on both operating frequency ranges. However, the disadvantage of this solution is that due to the intermediate frequency stages the embodiment is considerably complicate, and the manufacturing costs of the device will be high due to the high number of components.

In a direct conversion receiver, or in a zero intermediate frequency receiver, the radio frequency signal is transformed directly to the baseband without an intermediate frequency. Because no intermediate frequency stages are required the receiver requires only few components, wherefore it is an advantageous solution for many applications, such as mobile stations. Solutions for practical embodiments are described in more detail i.a. in the patent application publication EP 0 594 894 AI.

Figure 1:
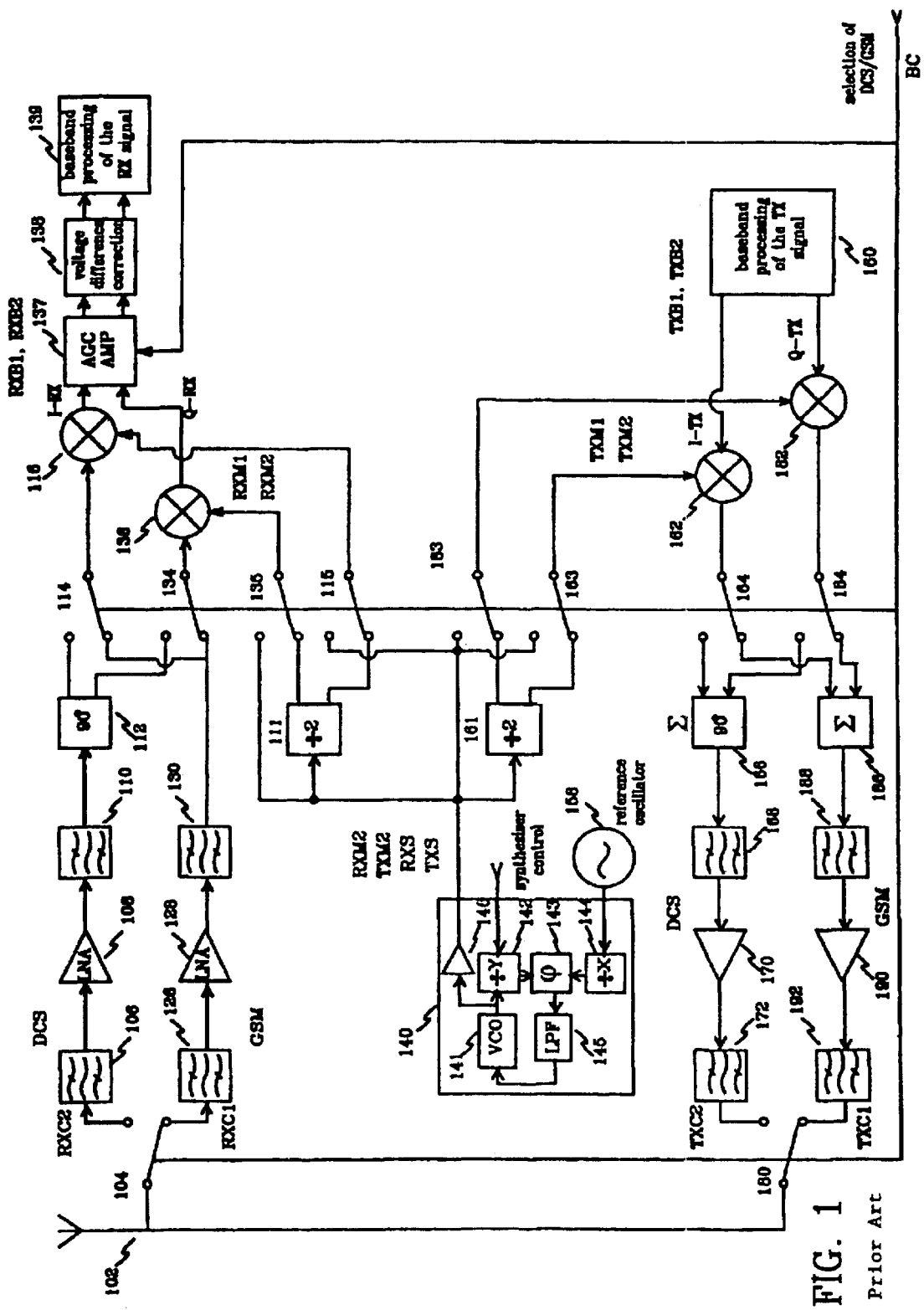

FIG. 1 shows a previously known block diagram of a mobile station's transceiver, where the receiver is a so called direct transform receiver. There the RF signal received by the antenna is connected with the switch 104 either to the DCS branch or to the GSM branch of the circuit. When receiving a signal of the DCS frequency range the received signal is supplied in the DCS branch to a bandpass filter 106, an LNA (Low Noise Amplifier) 108 and a bandpass filter 110. Then from this signal the block 112 generates components with a mutual 90 degrees phase shift. The in-phase component I and the quadrature component Q are further supplied via the switches 114 and 134 to the mixers 116 and 136.

The mixing signal to the mixers is obtained from the synthesiser 140 having a frequency which corresponds to the received carrier frequency, whereby the obtained mixing results are the in-phase component and the quadrature component of the complex baseband signal. The baseband signal is further supplied to the AGC (Automatic Gain Control) 137 and the correction block 138 for the voltage difference. Then the signal is further processed in the baseband processing unit, block 139, for the received or RX signal.

When a GSM signal is received the switch 104 directs the received signal to the GSM branch, which correspondingly has in a series connection a bandpass filter 126, a low noise amplifier 128 and a bandpass filter 130. Then the signal is supplied with the same phase to the mixers 116 and 136. Now the switches 115 and 135 select a signal from the synthesiser as the mixing frequency having a frequency which is divided by two in the block 111. In block 111 there is formed two signals with a mutual 90 degrees phase shift to the mixers 116 and 136. Thus the 90 degrees phase shift required by the mixing is not made on the received signal but on the mixing signal. The complex baseband signal from the mixers is supplied to the processing unit 139 for the received baseband or RX signal.

In a known way the synthesiser 140 comprises a PLL (Phase Locked Loop), which comprises a VCO (Voltage Controlled Oscillator) 141, the output signal of which is amplified by the amplifier 146 in order to generate the output signal. The frequency of the signal provided by the oscillator 141 is divided by an integer Y in the divider 142, and the resulting signal is supplied to the phase comparator 143. Correspondingly, the frequency of the signal generated by the reference oscillator 158 is divided by an integer X in the divider 144 and supplied to the phase comparator 143. The phase comparator outputs a signal which is proportional to the phase difference of said two input signals, whereby the output signal is supplied to an LPF (Low Pass Filter) 145, and the filtered signal will further control the voltage controlled oscillator 141. The above described phase locked loop operates in a known way so that the output frequency of the synthesiser is locked to the frequency coming to the phase comparator from the reference frequency branch. The output frequency is controlled by changing the divisor Y.

In the transmitter section the complex baseband transmission signal or TX signal is processed in the TX signal processing unit 160, from where the complex components of the signal are directed to the mixers 162 and 182, where the carrier frequency signal is generated by mixing the input signal with the mixing signal. If the DCS frequency is used in the transmission then the switches 111 and 161 select the output signal of the synthesiser 140 as the mixing signal. The obtained DCS signal is supplied to the bandpass filter 168, the amplifier 170 and the bandpass filter 172. The generated RF signal is further supplied to the antenna 102 by the switch 180.

If the transmission is on the GSM frequency range, then the mixing signal is generated by dividing the frequency of the output signal from the synthesiser 140 by two in the divider 161, from where there is obtained two mixing signals with a mutual 90 degrees phase shift for the first TX mixer 162 and the second TX mixer 182. The signal at the carrier frequency is supplied by the switches 164 and 184 to the GSM branch, where the in-phase component and the quadrature component obtained from the mixers 162 and 182 are added, block 186. Then there is filtering and amplification in the blocks 188, 190 and 192. The generated RF signal is supplied to the antenna 102 by the switch 180. Thus at the GSM frequency the 90 degrees phase shift is made on the mixing signal and not on the signal at the carrier frequency obtained as a mixing result.

The above mentioned controllable blocks receive their control from a processing unit (not shown in FIG. 1), which can contain for instance a microprocessor and/or a DSP (Digital Signal Processor). Further a mobile station comprises a memory unit associated with the processing unit and user interface means, which comprise a display, a keypad, a microphone and speaker, which neither are presented in FIG. 1.

A problem associated with the solution shown in FIG. 1 is to obtain a sufficiently accurate phase: the accuracy requirements on the phase difference between the I and Q components is of the order of a few degrees. On the other hand the control of the phase accuracy is complicated by the operation on two frequency ranges far from each other. As the phase shift in conventional RC phase shifters depends i.a. on the frequency and the temperature of the component it is difficult to achieve a sufficiently accurate phase over the whole frequency band and in all operating conditions. In addition the phase accuracy of the synthesiser is lower at the higher frequency range, because the output frequency of the VCO is the same as the RX/TX mixing frequency.

Further, known transceiver arrangements observe only the operation on two frequency ranges. However, as the number of systems operating on different frequency ranges is increasing it is desirable to provide transceiver devices operating also on more than two frequency ranges. To this end the prior art has not presented any solution The object of the invention is to create a simple solution in order to realise a transceiver operating on at least two frequency ranges, so that the above presented disadvantages associated with prior art solutions can be avoided.

One idea of the invention is to use a transceiver based on the direct transform and where the mixing frequency is generated with the aid of the same synthesiser when operating on different frequency ranges. This is preferably realised so that when operating on frequency ranges far from each other the output signal of the synthesiser is divided with different divisors in order to generate the mixing frequency. When operating on frequency ranges which are close to each other the divisor used in the feedback of the synthesiser is advantageously changed. In this way it is possible to realise a transceiver which has several operating frequency ranges close to each other.

With the aid of the invention it is possible to generate, in connection with the division of the synthesiser frequency, two mixing signals with a mutual 90 degrees phase shift, whereby no RC phase shifters are required in the signal line and the obtained phase accuracy is good and independent of the frequency.

As the synthesiser operates on a high frequency in the solution according to the invention it is possible to use a higher frequency in the phase comparator and/or a loop filter operating on a wide band, due to which the synthesiser will have a short settling time. Further, due to the high operating frequency the frequency resolution will be increased, whereby the synthesiser can be controlled to channels with frequencies closer to each other. A transceiver according to the invention can further be realised as a simple transceiver with low manufacturing costs, as the circuits can be easily integrated.

A direct transform transmitter/receiver operating on at least two different frequency ranges, where the first frequency range comprises a first transmission range and a first reception range and where the second frequency range comprises a second transmission range and a second reception range, and whereby said receiver comprises at least one RX mixer for mixing a received signal to a baseband signal, said transmitter comprises at least one TX mixer for mixing a baseband signal to a transmission signal at a carrier frequency, the transmitter/receiver comprises synthesiser means, to the output of the synthesiser means there is connected first frequency division means for generating a first in-phase RX mixing signal and a first 90 degrees phase shifted RX mixing signal for the RX mixer in order to mix a signal received at the first reception frequency range to a baseband signal, and to the output of the synthesiser means there is connected second frequency division means for generating a first in-phase TX mixing signal and a first 90 degrees phase shifted TX mixing signal for the TX mixer in order to mix a first baseband TX signal to a first TX signal at the carrier frequency in the first transmission frequency range, is characterised in that the transmitter/receiver further comprises third frequency division means connected to the output of the synthesiser means for generating a second in-phase RX mixing signal and a second 90 degrees phase shifted RX mixing signal from the output signal of said synthesiser means in order to mix a signal received on a second reception frequency range to a second baseband RX signal, and fourth frequency division means connected to the output of the synthesiser means for generating a second in-phase TX mixing signal and a second 90 degrees phase shifted TX mixing signal from the output signal of said synthesiser means in order to mix a second baseband TX signal to a second signal at the carrier frequency on the second transmission frequency range.

Preferred embodiments of the invention are presented in the dependent claims.

Figure 2:
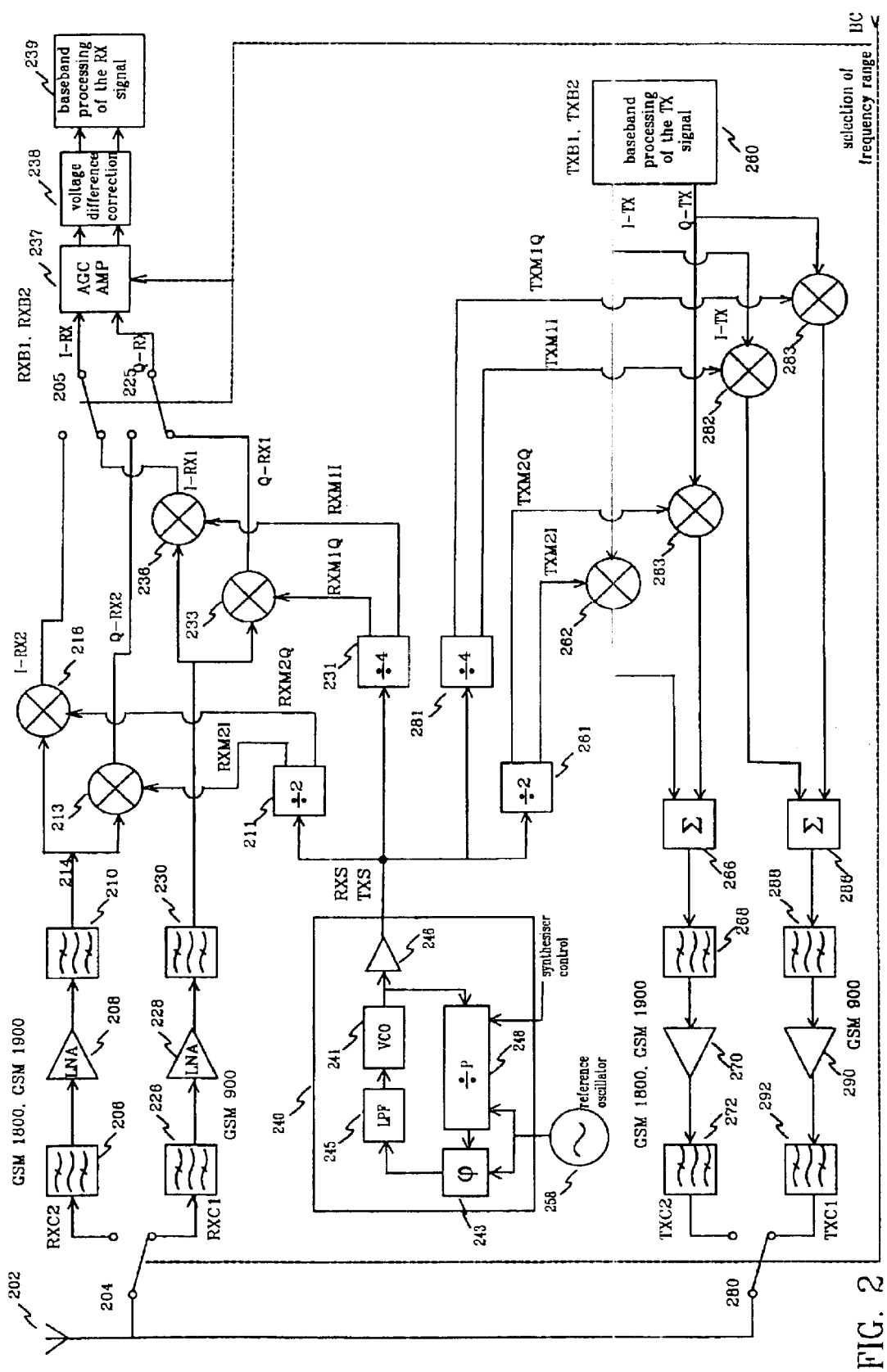
Figure 3:
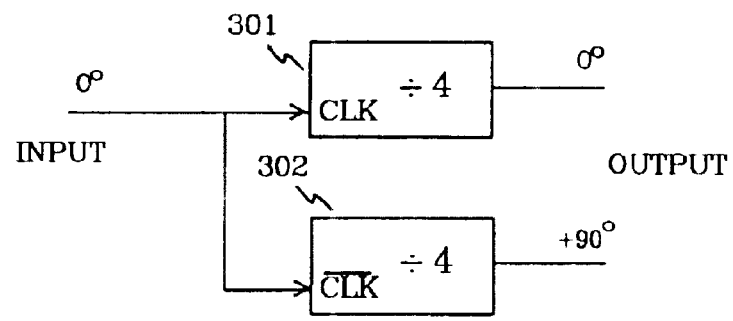
Figure 4:
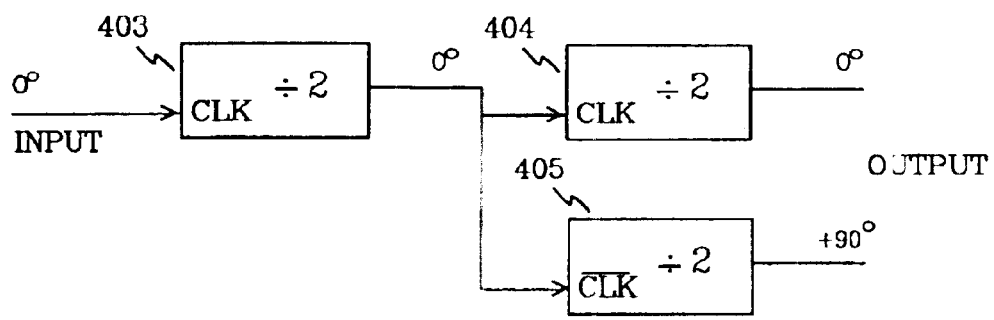
Figure 5:
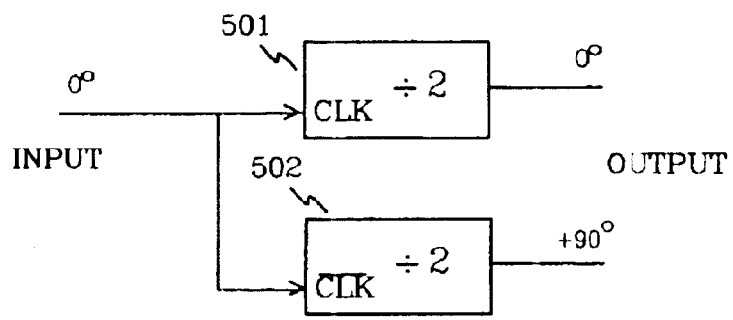

The invention is described in more detail below with reference to the enclosed drawings, where FIG. 1 shows in a block diagram a transceiver based on prior art direct transform, FIG. 2 shows in a block diagram a solution according to the invention in order to realise a transceiver operating on at least two frequency ranges, FIG. 3 shows in a circuit diagram a solution for generating the differently phased signals of the lower frequency range, FIG. 4 shows in a circuit diagram another solution for generating the differently phased signals of the lower frequency range, and FIG. 5 shows in a circuit diagram a solution for generating the differently phased signals of the higher frequency range.

FIG. 1 was already described in connection with the description of prior art. Below we describe a transmitter/receiver according to the invention with the aid of FIG. 2. Finally we describe with reference to the FIGS. 3 to 5 possible ways to realise the generation of differently phased signals in a transceiver according to the invention.

FIG. 2 shows in a block diagram a transceiver according to the invention. The transceiver shown in FIG. 2 operates on three frequency ranges. These are the GSM 900 system operating on the 900 MHz frequency range, the GSM 1800 system operating on the 1800 MHz frequency range, and the GSM 1900 system operating on the 1900 MHz frequency range. The reception and transmission frequencies of a terminal used in these systems are presented in the table below.

| System | Reception frequency | Transmission frequency |
| --- | --- | --- |
| GSM 900 | 925–960 MHz | 880–915 MHz |
| GSM 1800 | 1805–1880 MHz | 1710–1785 MHz |
| GSM 1900 | 1930–1990 MHz | 1850–1910 MHz |

The receiver of FIG. 2 has two RF reception branches, of which the first one is used on the 900 MHz frequency range and the second one on the frequency ranges of 1800 MHz and 1900 MHz. The RF signal received by the antenna 202 is directed by the switch 204 to the reception branch according to the frequency range to be received. Then the pass band of the band pass filters 226 and 230 in the reception branch of the lower frequency range is about 925–960 MHz, and the pass band of the band pass filters 206 and 210 in the reception branch of the higher frequency range is about 1805–1990 MHz. Correspondingly, the pass band of the transmitter's band pass filters 288 and 292 of the lower frequency range is about 880–915 MHz and the pass band of the transmitter's band pass filters 268 and 272 of the higher frequency range is about 1710–1910 MHz.

Both reception branches have low noise amplifiers 208 and 228 between the band pass filters. The filtered and amplified received signal at the carrier frequency of the lower frequency range is supplied with the same phase to the mixers 213 and 233.

The filtered and amplified received signal at the carrier frequency of the higher frequency range is supplied with the same phase to the mixers 233 and 236. Thus the carrier frequency parts are advantageously common for both higher frequency ranges.

The mixing signals of the lower frequency range are obtained from the synthesiser output signal by dividing it by four in the divider 231. The divider 231 generates the in-phase mixing signal RXM1I and the 90 degrees phase shifted mixing signal RXM1Q required in the mixing. The mixing signals of the higher frequency ranges are obtained from the synthesiser output signal by dividing this frequency by two in the divider 211. The divider 211 generates the in-phase mixing signal RXM2I and the 90 degrees phase shifted mixing signal RXM2Q required in the mixing. Thus the 90 degrees phase shift required in the mixing is not made on the received signal but on the mixing signal.

The complex baseband signal I-RX, Q-RX obtained from the mixers is further supplied to the AGC block (Automatic Gain Control) 237 and the correction block 238 of the difference voltage. Then the signal is further processed in the baseband processing unit, block 239, of the received RX signal.

The synthesiser 240 operates as follows. The synthesiser comprises a voltage controlled oscillator VCO 241, and the output signal of the VCO is amplified by the amplifier 246 in order to generate the output signal RXS, TXS. The frequency of the signal supplied by the oscillator 241 is divided by P in the divider block 248. The number P is preferably an integer, but it may also be for instance a fraction. The resulting signal is supplied to the phase comparator 243, where the phase of the signal is compared with the phase of the signal generated by the reference oscillator 258. When required, the frequency of the reference oscillator's output signal may be also divided before the phase comparison, for instance with a controlled divider. The phase comparator generates a signal which is proportional to the phase difference of said two input signals, whereby the output signal is supplied to the low-pass filter 245, and the filtered signal further controls the voltage controlled oscillator 241.

In the transmitter section the complex baseband signal or the TX signal is generated in the processing unit 260 for the TX signal, which generates the complex signal components I-TX and Q-TX. The complex signal is supplied to the mixers 262, 263, which generate the carrier frequency signal of the higher frequency ranges, and to the mixers 282 and 283, which generate the carrier frequency signal of the lower frequency range.

The mixing signals of the lower frequency range are obtained from the synthesiser's output signal by dividing this frequency by four in the divider 281. The divider generates the in-phase mixing signal TXM1I and the 90 degrees phase shifted mixing signal TXM1Q required in the mixing. The mixing signals of the higher frequency ranges are obtained from the synthesiser's output signal by dividing this frequency by two in the divider 261. The divider 261 generates the in-phase mixing signal TXM2I and the 90 degrees phase shifted mixing signal TXM2Q required in the mixing. Thus the 90 degrees phase shift required in the mixing is not made on the transmission signal but on the mixing signal.

When using the lower frequency range the in-phase component and the quadrature component obtained from the mixers 282 and 283 are added in block 286, and then the signal is supplied to the bandpass filter 288, amplifier 290 and the bandpass filters 292. The generated RF signal is further supplied by the switch 280 to the antenna 202 for transmission.

The in-phase component and the quadrature component obtained from the mixers 262 and 263 of the higher frequency ranges are added in block 266, and the signal is supplied to the bandpass filter 268, amplifier 270 and the bandpass filter 272. The generated RF signal is further supplied via the switch 280 to the antenna 202 for transmission. Thus the carrier frequency sections are advantageously common for both higher frequency ranges.

It must be noted that the mixing signals of the reception and the transmission can also be generated with the aid of the same frequency divider. Then the frequency divider's outputs with different phases can be connected either to the receiver's RX mixers during reception or to the transmitter's TX mixers during transmission, for instance with the aid of controllable switches. Then the switches are controlled with a signal which is in a first state during the reception time slot and in a second state during the transmission time slot. Another alternative when using one divider is to direct the signals obtained from the divider to the mixers of both the transmitter and the receivers, during both transmission and reception. Then the signals can be branched to said mixers with the aid of a divider means, such as a power divider.

Further it must be noted that the instead of the shown dividers dividing by two/four it is also possible to use other dividers for generating the RX and TX mixing frequencies from the signal generated by the synthesiser. Thus the frequency division function could be some else than the division by two/four, depending e.g. on the used operating frequency ranges and on the frequency of the synthesiser's output signal.

Further it must also be noted that for the lower and the higher frequency ranges is also possible to use a common mixer, whereby the mixing signal supplied to the mixer is selected for instance with switch means. Further switch means are required also for the selection of the signal branch connected to the mixer. The advantage of this solution is that the number of required mixers is lower, but on the other hand a disadvantage is that the operating frequency range required by the mixers is wider.

The change-over switches 204, 205, 225 and 280 are most suitably controlled by a two-level signal BC (Band Control). On the first level of the control signal the change-over switches are in a position where the high frequency circuits of the lower frequency ranges are used, and on the second level the change-over switches are in a position where the high frequency circuits of the higher frequency ranges are used. The values of the first and second levels of the control signal BC depend i.a. on the embodiment of the change-over switches.

Instead of the change-over switches 204, 205, 225 and 280 it is also possible to apply ply any other known method for directing the path of the high frequency signal. The change-over switches can be replaced for instance by matching means known per se, whereby, when using the first frequency range the high frequency circuits of the second frequency range present a high impedance to the signals of the first frequency range. Correspondingly, when using the second frequency range, the high frequency circuits of the first frequency range present a high impedance to the signals of the second frequency range. Then the high frequency circuits of the different frequency ranges do not interfere with the operation of each other.

The signal BC controlling the change-over switches is most suitably generated in the mobile station's processing block (not shown in the figures) which advantageously comprises a processor, such as a microprocessor. The processing block generates the signal for instance on the basis of a system reselection instruction entered by the user via the keypad. The system reselection can be for instance menu based, whereby the desired system is selected by picking it from a menu presented in the display by pressing a key. Then the processing block generates a control signal BC which corresponds to the selected system. The system reselection instruction can also come via the mobile communication system, whereby the mobile station receives data transmitted by another system. The received data can contain a system reselection instruction, on the basis of which the processing block changes the system. A control program is stored in a memory unit which is associated with the processing block and receive comprises an EPROM or EEPROM memory, whereby the program monitors the received data, and when it detects a system reselection instruction in the data it supplies an instruction to the processing block for setting the control signal BC to a state according to the reselection instruction.

Further the processing block generates a synthesiser control signal, with which a divisor corresponding to the given channel frequency is given to the divider of the frequency synthesiser 240 (FIG. 2). Then the divider 248 of the synthesiser generates from the frequency of the voltage controlled oscillator VCO, 258, a phase comparison frequency for the phase comparator 243. For instance in the GSM system the channel distance is 200 kHz, whereby 200 kHz is used as the phase comparison frequency, or a multiple of 200 kHz if the VCO frequency is a multiple of the RX/TX mixing frequency.

One possible way to select the signal branch is also to switch off the operating voltages from that branch which is unused. This can be applied both in the transmitter and the receiver. An advantage of this alternative is that it does not necessarily require any actual selection switches.

FIG. 3 shows a phase shifter which divides the input frequency by four, and which can be used for generating the mixing signals of the lower frequency ranges in the embodiments of the blocks 231 and 281 (FIG. 2). The circuit comprises two dividers 301 and 302 which divide by four, whereby the input signal is supplied to the non-inverting input of the first divider 301 and to the inverting input of the second divider 302. This generates in a known way output signals with a frequency which is a quarter of the input signal's frequency and which have a mutual 90 degrees phase shift.

FIG. 4 shows another phase shifter which divides the input frequency by four and which can be used for generating the mixing signals of the lower frequency ranges in the embodiments of the blocks 231 and 281. The circuit comprises three dividers of which the first divider 403 divides the input signal frequency by two. The output of the first divider 403 is connected to two dividers 404 and 405, whereby the input signal of the first divider is supplied to the non-inverting input of the second divider 404 and to the inverting input of the third divider 405. This generates in a known way output signals with a frequency which is a quarter of the input signal's frequency and which have a mutual 90 degrees phase shift.

FIG. 5 shows a phase shifter which divides the input frequency by two and which can be used for generating the mixing signals of the higher frequency ranges in the embodiments of the blocks 211 and 261. The circuit comprises two dividers 501 and 502, whereby the input signal is supplied to the non-inverting input of the first divider 501 and to the inverting input of the second divider 502. This generates in a known way output signals with a frequency which is half of the input signal's frequency and which have a mutual 90 degrees phase shift.

The mixers 262 and 263 (the higher frequency ranges), or the mixers 282 and 283 (the lower frequency ranges), of the in-phase branch and the quadrature branch are presented as separate mixers in the block diagram shown in FIG. 2, but in practice they can be integrated on the same circuit, whereby the adding of two GSM transmission signals can be made at the common collector resistance of a previously known mixer of the Gilbert Cell type, whereby the collector resistance then acts as the adder 266, 286.

If the same mixer is used on the higher and lower frequency ranges it is possible to perform the addition also in a switch circuit which connects the signal after the mixers to the signal branch of the lower or the higher frequency ranges. An advantageous way is to realise the switches by using parallel transistor stages, whereby the selection of the signals is made for instance by connecting the operating voltage to that transistor stage through which the signal is wanted to pass, and by switching off the operating voltage from that stage which is wanted to be open connected. These same transistor stages can be used for adding the signals.

A third way is to perform the addition in the manner shown in FIG. 2, in a separate adder which is connected to the transmission chain after the mixer and the GSM/DCS selector switches.

With the aid of the solution according to the invention it is possible to have a very accurate 90 degrees phase shift between the mixing signals, because the phase shift is generated in the divider circuits 211, 231, 261 and 281. In addition, no phase shifters are needed in the reception and transmission signal branches.

Because in the solution according to the invention the synthesiser operates at a high frequency it is possible to use a loop filter operating on a wide band, and therefore the settling time of the frequency will be short. Further it is possible to use a higher reference frequency.

The transceiver according to the invention can also be realised as a simple transceiver with low manufacturing costs, because it is easy to integrate the circuits. As the circuits do not use intermediate frequencies they neither cause intermediate frequency interference, and they will not be disturbed by any external intermediate frequency interference. Thus the need for interference protection of the device will be minimal.

Above we presented some embodiments of the solution according to the invention. The inventive principle can of course be modified within the scope of the claims, for instance regarding the detailed embodiment and the field of application. Particularly it should be noted that it is quite possible to apply the solution according to the invention also in other communication systems as in the above mentioned GSM and DCS/PCN systems. In the same way the presented operating frequencies are mentioned only as examples, and the embodiment of the invention is in no way tied to them.

What is claimed is:

1. A direct transform transmitter/receiver operating on at least two different frequency ranges, whereby the first frequency range comprises a first transmission range and a first reception range and where the second frequency range comprises a second transmission range and a second reception range, and whereby said receiver comprises at least one RX mixer for mixing a received signal to a baseband signal, said transmitter comprises at least one TX mixer for mixing a baseband signal to a transmission signal at a carrier frequency, the transmitter/receiver comprises synthesiser means (240), to the output of the synthesiser means there is connected first frequency division means (231) for generating a first in-phase RX mixing signal (RXM1I) and a first 90 degrees phase shifted RX mixing signal (RXM1Q) for the RX mixer in order to mix a signal (RXC1) received at the first reception frequency range to a baseband signal (RXB1), and to the output of the synthesiser means there is connected a second frequency division means (281) for generating a first in-phase TX mixing signal (TXM1I) and a first 90 degrees phase shifted TX mixing signal (TXM1Q) for the TX mixer in order to mix a first baseband TX signal to a first TX signal at the carrier frequency in the first transmission frequency range, characterised in that the transmitter/receiver further comprises third frequency division means (211) connected to the output of the synthesiser means for generating a second in-phase RX mixing signal (RXM2I) and a second 90 degrees phase shifted RX mixing signal (RXM2Q) from the output signal (RXS) of said synthesiser means in order to mix a signal received on a second reception frequency range to a second baseband RX signal (RXB2), and fourth frequency division means (261) connected to the output of the synthesiser means for generating a second in-phase TX mixing signal (TXM2I) and a second 90 degrees phase shifted TX mixing signal (TXM2Q) from the output signal (TXS) of said synthesiser means in order to mix a second baseband TX signal (TXB2) to a second signal (TXC2) at the carrier frequency on the second transmission frequency range.

2. A transmitter/receiver according to claim 1, characterised in that it comprises a first RX mixer (236) for generating the in-phase component (I-RX1) of the baseband signal, a second RX mixer (233) for generating the quadrature component (Q-RX1) of the baseband signal, operating on the first reception frequency range, and a first TX mixer (282) for mixing the in-phase component of the base-band signal to the carrier frequency, and a second TX mixer (283) for mixing the quadrature component of the baseband signal to the carrier frequency, operating on the first transmission frequency range.

3. A transmitter/receiver according to claim 2, characterised in that it comprises a first adder (286) for adding said carrier frequency signal components on the first transmission frequency range.

4. A transmitter/receiver according to claim 1, characterised in that it comprises a third RX mixer (216) for generating the in-phase component (I-RX 2) of the complex baseband signal, fourth RX mixer (213) for generating the quadrature component (Q-RX2) of the complex baseband signal, operating on the second reception frequency, and a third TX mixer (262) for mixing the in-phase component of the complex baseband signal to the carrier frequency, and a fourth TX mixer (263) for mixing the quadrature component of the complex baseband signal to the carrier frequency, operating on the second transmission frequency range.

5. A transmitter/receiver according to claim 2, characterised in that it comprises a second adder (266) for adding said carrier frequency signal components on the second transmission frequency range.

6. A transmitter/receiver according to claim 1, characterised in that said first and second frequency division means (231, 281) are dividers dividing by four, and that said third and fourth frequency division means (211, 261) are dividers dividing by two.

7. A transmitter/receiver according to claim 1, characterised in that said first frequency division means (231) and second frequency division means (281) are the same frequency division means, and that said third frequency division means (211) and fourth frequency division means (261) are the same frequency division means.

8. A transmitter/receiver according to claim 1, which comprises a synthesiser, characterised in that the synthesiser has a controlled oscillator (241) for generating an output frequency signal, frequency division means (248) of the synthesiser for dividing the signal frequency generated by the oscillator in order to set the output frequency of the synthesiser so that it corresponds to a selected frequency channel, a phase comparator (243) for generating a control signal on the basis of the phase difference of the signal received from the frequency division means (248) and a signal derived from a reference oscillator, and a loop filter (245) for setting the response of the synthesizer.

9. A transmitter/receiver according to claim 8, characterised in that the transmitter/receiver comprises a third reception frequency range and a third transmission frequency range, whereby said synthesiser comprises means (248) for changing the output frequency of the synthesiser so that it corresponds to the second and third transmission frequency range.

10. A transmitter/receiver according to claim 9, characterised in that for the second and third reception frequency ranges the transmitter/receiver comprises common processing sections (206, 208, 210, 213, 216) for the carrier frequency signal.

11. A transmitter/receiver according to claim 9, characterised in that for the second and third transmission frequency ranges it comprises common signal processing sections (262, 263, 266, 268, 270, 272) for the carrier frequency signal.

12. The direct transform transmitter/receiver according to claim 1, wherein the signals received at the first and second reception frequency ranges are received from a GSM type system, and the signals on the first and second transmission frequency ranges are transmitted to the GSM type system.

13. The direct transform transmitter/receiver according to claim 1, wherein the signals received at the first and second reception frequency ranges are received from a UMTS type system, and the signals on the first and second transmission frequency ranges are transmitted to the UMTS type system.

* * * * *